United States Patent
Dow et al.

(10) Patent No.: US 9,514,037 B1
(45) Date of Patent: Dec. 6, 2016

(54) TEST PROGRAM SCHEDULING BASED ON ANALYSIS OF TEST DATA SETS

(71) Applicant: International Business Machines Corporation, Armonk, NY (US)

(72) Inventors: Eli M. Dow, Poughkeepsie, NY (US); Thomas D. Fitzsimmons, Poughkeepsie, NY (US); Emily M. Metruck, Poughkeepsie, NY (US); Charles J. Stocker, IV, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/971,436

(22) Filed: Dec. 16, 2015

(51) Int. Cl.
  *G06F 9/44* (2006.01)
  *G06F 11/36* (2006.01)
  *G06Q 10/06* (2012.01)

(52) U.S. Cl.
  CPC ..... *G06F 11/3688* (2013.01); *G06Q 10/06315* (2013.01)

(58) Field of Classification Search
  CPC .............. G06F 11/3466; G06F 2201/865; G06F 11/3636
  USPC ........................................................ 717/130
  See application file for complete search history.

(56) References Cited

U.S. PATENT DOCUMENTS

| | | | |
|---|---|---|---|
| 8,762,997 B2 | 6/2014 | Moon et al. | |
| 8,990,639 B1 | 3/2015 | Marr et al. | |
| 9,292,421 B2* | 3/2016 | Bassin | G06Q 10/06 |
| 2011/0154353 A1 | 6/2011 | Theroux et al. | |
| 2014/0330605 A1* | 11/2014 | Connolly | G06Q 10/063116 705/7.16 |
| 2014/0330606 A1* | 11/2014 | Paget | G06Q 10/06311 705/7.18 |
| 2014/0337532 A1 | 11/2014 | Arnette et al. | |
| 2015/0067636 A1* | 3/2015 | Bassin | G06Q 10/06 717/102 |

* cited by examiner

*Primary Examiner* — John Chavis
(74) *Attorney, Agent, or Firm* — Cantor Colburn LLP; Steven Chiu

(57) ABSTRACT

A computer program product includes a tangible storage medium storing instructions for execution by a processing circuit for performing a method. The method includes receiving a test program configured to including a plurality of test data sets, and analyzing the plurality of test data sets to identify one or more predictable test data sets and one or more dynamic test data sets, the one or more predictable test data sets expected to produce a predictable test result, the one or more dynamic test data sets not expected to produce a predictable test result. The method also includes determining a cost structure associated with executing the test program using a computing resource, setting a test schedule based on identification of the one or more predictable test data sets and the one or more dynamic test data sets, and executing the test program based on the test schedule.

20 Claims, 6 Drawing Sheets

| Window | × |
|---|---|

Test Case Analysis

Common Pass (>96%)  ☐ Select All

| Test Name | Time to Run |
|---|---|
| ☑ Test 1 | 30 min |
| ☐ Test 2 | 1 hr 10 min |
| ☐ Test 3 | 4 min |
| ☐ Test 4 | 30 min |

Common Fail (>99%)  ☐ Select All

| Test Name | Time to Run |
|---|---|
| ☐ Test 9 | 45 min |
| ☑ Test 11 | 22 min |
| ☐ Test 15 | 1 hr 35 min |
| ☑ Test 16 | 10 min |

Dynamic Tests  ☐ Select All

| Test Name | Time to Run |
|---|---|
| ☑ Test 5 | 6 min |
| ☑ Test 10 | 2 hr 10 min |
| ☑ Test 12 | 15 min |
| ☑ Test 17 | 40 min |

Cost to run tests now: $34.00

Only run selected tests is estimated to cost: $25.00

Only run selected tests when spot pricing is below: $ ▾ 10 ⬍ / Hour ▾

[ OK ]  [ CANCEL ]

*FIG. 6*

TEST PROGRAM SCHEDULING BASED ON ANALYSIS OF TEST DATA SETS

BACKGROUND

The present invention relates generally to scheduling and executing computer product testing, and more specifically, to analyzing test data and scheduling execution of test processes.

Development of computer products, including computer systems and software, typically involves performing repeated tests to ensure that specifications are met and to identify errors or problems. As such testing can be potentially complex and time consuming, it is important to find ways to improve efficiency and reduce costs related to time, computing resources and monetary outlays.

With the development of cloud based services and other computing services, testing can be performed using distributed services representing shared computing infrastructures. As such services become more popular and widely used, the number of tasks requested to be performed using these services increasing, potentially resulting in resource and/or scheduling limitations.

SUMMARY

An embodiment of a computer program product for testing of a computer product includes a tangible storage medium readable by a processing circuit and storing instructions for execution by the processing circuit for performing a method. The method includes receiving a test program configured to perform an evaluation of a computer product, the test program including a plurality of test data sets, and analyzing the plurality of test data sets to identify one or more predictable test data sets and one or more dynamic test data sets, the one or more predictable test data sets expected to produce a predictable test result, the one or more dynamic test data sets not expected to produce a predictable test result. The method also includes determining a cost structure associated with executing the test program using a computing resource, setting a test schedule based on identification of the one or more predictable test data sets and the one or more dynamic test data sets, and executing the test program at the computing resource based on the test schedule.

A computer implemented method for testing of a computer product includes receiving, by a processing device, a test program configured to perform an evaluation of a computer product, the test program including a plurality of test data sets, and analyzing the plurality of test data sets to identify one or more predictable test data sets and one or more dynamic test data sets, the one or more predictable test data sets expected to produce a predictable test result, the one or more dynamic test data sets not expected to produce a predictable test result. The method also includes determining a cost structure associated with executing the test program using a computing resource, setting a test schedule based on identification of the one or more predictable test data sets and the one or more dynamic test data sets, and executing the test program at the computing resource based on the test schedule.

A system for testing of a computer product includes a processing device configured to transmit data to a computing resource and receive data from the computing resource, the computing resource configured to receive requests for execution of a test program, the processing device configured to perform a method. The method includes receiving the test program configured to perform an evaluation of a computer product, the test program including a plurality of test data sets, and analyzing the plurality of test data sets to identify one or more predictable test data sets and one or more dynamic test data sets, the one or more predictable test data sets expected to produce a predictable test result, the one or more dynamic test data sets not expected to produce a predictable test result. The method also includes determining a cost structure associated with executing the test program using a computing resource, setting a test schedule based on identification of the one or more predictable test data sets and the one or more dynamic test data sets, and executing the test program at the computing resource based on the test schedule.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 depicts an example of a display and user interface.

DETAILED DESCRIPTION

There are provided methods, devices, systems and computer program products for performing aspects of computer product testing and scheduling execution of testing processes at a computing resource. An embodiment of a method of testing a computer product (e.g., a computer system or software) includes generating or receiving a test program that includes a plurality of test data sets. The test data sets, in one example, are test scenarios, otherwise known as "test buckets", or "test cases" configured to apply to at least a portion of the computer product under test. The test data sets are analyzed to identify test data sets having predictable test results ("predictable data sets"), such as data sets having a pass rate that is greater than or equal to a selected threshold. Test data sets not having predictable results ("dynamic data sets") are also identified.

In one embodiment, the method includes determining a cost structure associated with a computing resource such as a cloud service or other computing service, and determining a test schedule based on the cost structure. For example, the cost structure includes prices associated with using the computing resources at various time periods. The test schedule may be set based on prices associated with different time periods, e.g., the schedule can be set to execute dynamic test data sets at a first time period, and execute predictable test data sets at a later time when prices are lower.

Embodiments described herein provide for cost savings by separating and prioritizing dynamic data sets to take full advantage of limited resources. For example, in cases where time and/or cost are limited, the embodiments allow for deferring execution of predictable data sets until costs are lower.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
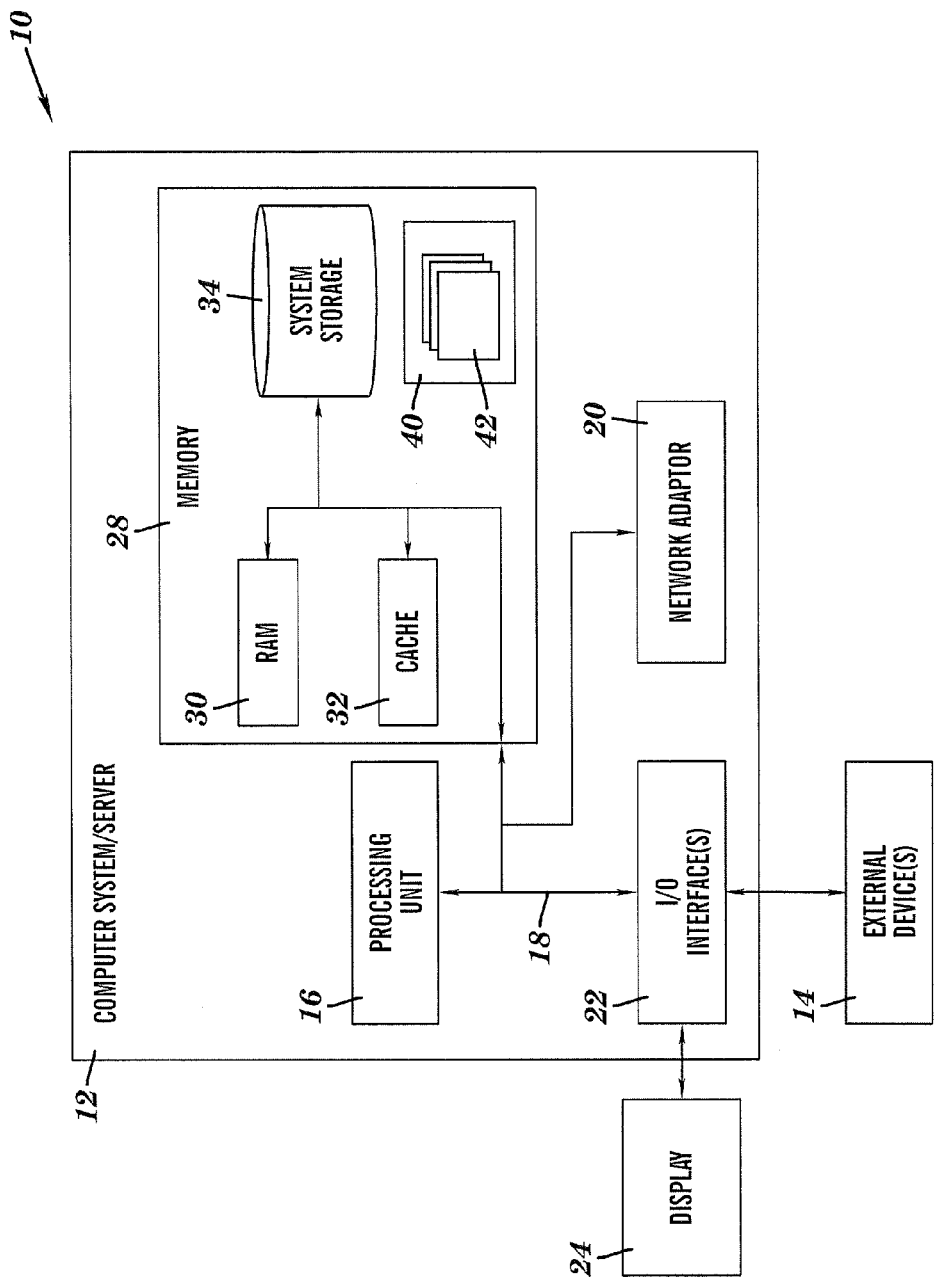
FIG. 1 depicts an embodiment of a computer system.

FIG. 1 illustrates an example of a computing system 10 that can be used to perform various actions, including receiving and processing user inputs and performing various processing actions as described herein, including storing and processing data, executing programs and displaying information. The computing system 10 includes a processing device 12, such as a computer, server, laptop or mobile device. Components of the processing device 12 may include, but are not limited to, one or more processors or processing units 16, a system memory 28, and a bus 18 that couples various system components including the system memory 28 to the processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The processing device 12 typically includes a variety of computer system readable media. Such media may be any available media that is accessible by the processing device 12, and includes both volatile and non-volatile media, removable and non-removable media.

The system memory 28 can include computer system readable media in the form of volatile memory, such as a random access memory (RAM) 30 and/or cache memory 32. The processing device 12 may further include other removable/non-removable, volatile/non-volatile computer system storage media. For example, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

A program/utility suite 40, having a set (at least one) of program or processing modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The processing device 12 may also communicate with one or more external devices 14 such as a keyboard, a pointing device, a display 24, etc.; one or more devices that enable a user to interact with the processing device 12; and/or any devices (e.g., network card, modem, etc.) that enable the processing device 12 to communicate with one or more other computing devices. Such communication can occur via Input/Output (I/O) interfaces 22. Still yet, the processing device 12 can communicate with one or more networks such as a local area network (LAN), a general wide area network (WAN), and/or a public network (e.g., the Internet) via a network adapter 20. As depicted, the network adapter 20 communicates with the other components of the processing device 12 via the bus 18. It should be understood that although not shown, other hardware and/or software components could be used in conjunction with the processing device 12. Examples, include, but are not limited to: microcode, device drivers, redundant processing units, external disk drive arrays, RAID systems, tape drives, and data archival storage systems, etc.

The processing device 12 may be described in the general context of computer system executable instructions, such as program modules, being executed by a computer system. Generally, program modules may include routines, programs, objects, components, logic, data structures, and so on that perform particular tasks or implement particular abstract data types. The processing device 12 may be practiced in distributed cloud computing environments where tasks are performed by remote processing devices that are linked through a communications network. In a distributed cloud computing environment, program modules may be located in both local and remote computer system storage media including memory storage devices.

In one embodiment, the system 10 and/or components thereof are configured as part of a cloud computing environment. For example, the processing device 12 is a server, client computer or other device or system is part of a cloud computing node. The system 10 and the processing device 12 is only one example of a suitable cloud computing node and is not intended to suggest any limitation as to the scope of use or functionality of embodiments of the invention described herein. Regardless, the cloud computing node is capable of being implemented and/or performing any of the functionality set forth hereinabove.

As part of a cloud computing node, the processing device 12 is operational with numerous other general purpose or special purpose computing system environments or configurations. Examples of well-known computing systems, environments, and/or configurations that may be suitable for use with the processing device 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
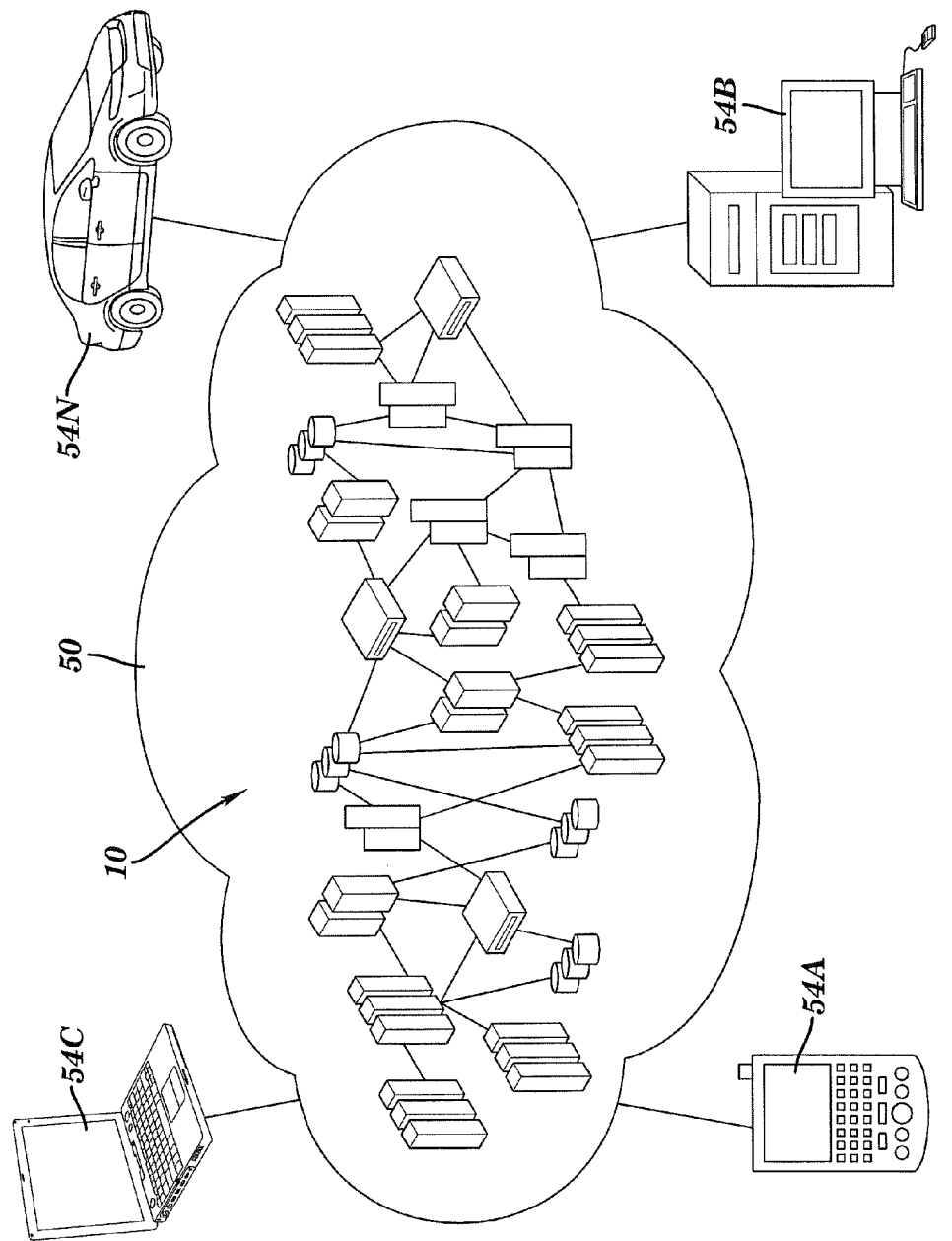
FIG. 2 depicts a cloud computing environment according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
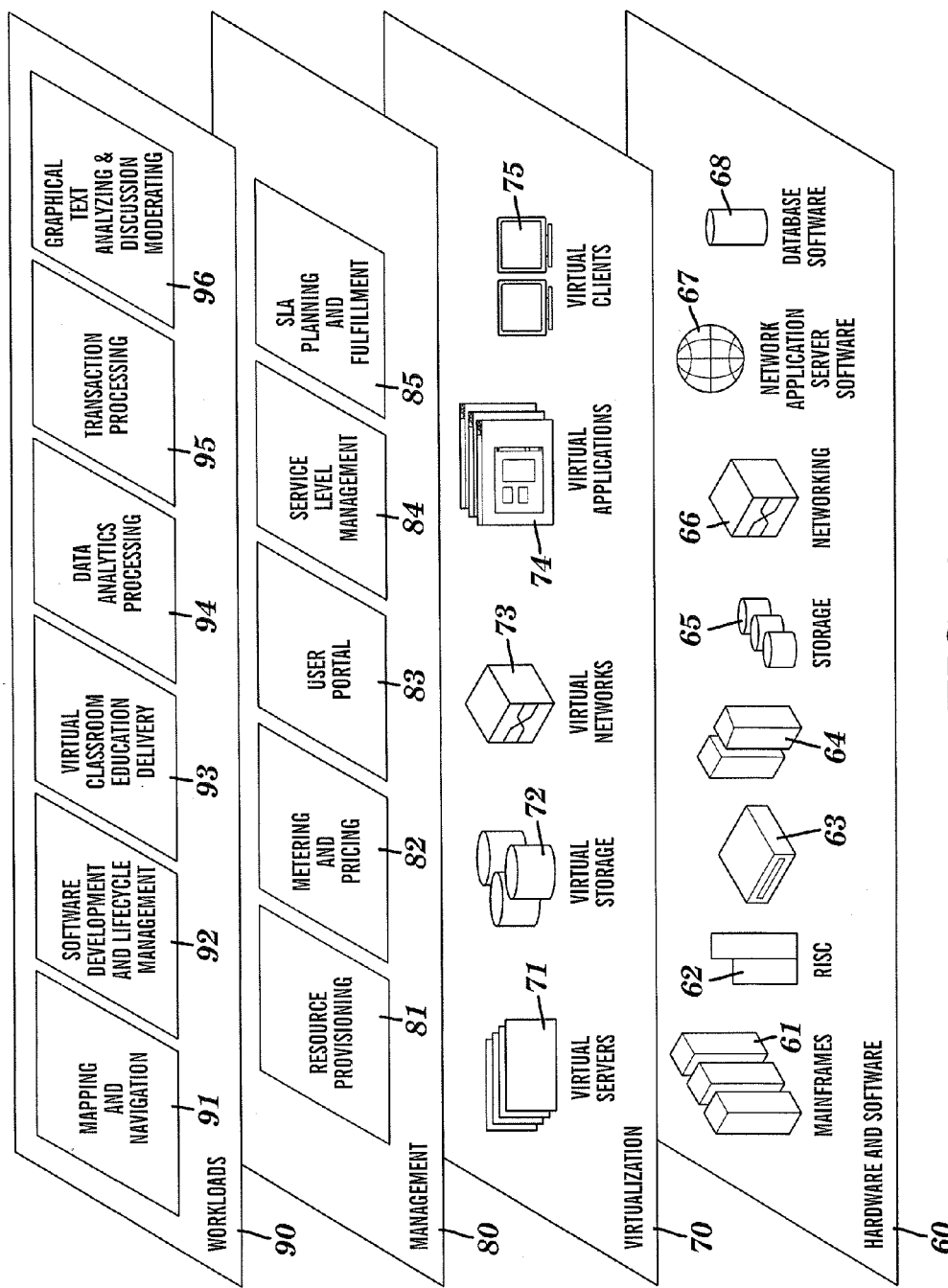
FIG. 3 depicts functional abstraction layers provided by the cloud computing environment of FIG. 2.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities (e.g., virtual machines) may be provided: virtual servers 71; virtual storage 72; virtual networks 73, including virtual private networks; virtual applications and operating systems 74; virtual clients 75; and a virtual machine allocation application. In an exemplary embodiment, an application, such as a virtual machine allocation application in the virtualization layer 70, may implement processes or methods for determining and/or performing virtual machine plan generation and allocations as described herein; however, it will be understood that the application may be implemented in any layer.

In another example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

A processing system or device, such as the computer 12, is configured to perform and/or facilitate testing of computer products and scheduling tests. A "computer product" is any computing device, system or data set configured to perform one or more processing operations. Examples of computer products include various computer systems, hardware components such as microprocessors, and software components such as software programs or program suites. Embodiments are described herein in conjunction with testing a computer program, but can be employed to test any suitable product.

The device is configured to generate and/or receive a set of data and instructions that, when executed, performs one or more tests on the computer program. The set of data and instructions may include test cases applied to a product under test or portions of the product, testing tools, aids and other programs, instructions generated or selected by a user, and any other form of data. The collection of test cases and any other programs, data and/or instructions utilized to evaluate a program under test is referred to herein as a "test program". The test program is applied to a product under test or portions of a product under test to evaluate the performance of the product, e.g., in response to various scenarios or test cases. The program may be tested to evaluate behavior at various stages of the program and/or evaluate the quality of the product's overall output.

An example of a form of testing is referred to as regression testing, which is used to detect new problems or bugs in a program that may occur due to changes in the product (e.g., patches, updates, new versions or configuration changes). Regression testing is performed to ensure that such changes have not resulted in new faults or errors, and typically involves running a test multiple times and determining whether the program behavior has changes relative to a previous test and/or whether new or repeating faults occur. A regression test may be performed any number of times.

In one embodiment, a test program is applied to a product as a collection of constituent data sets, referred to herein as "test data sets". An example of a test data set is a test bucket, which is an object or data structure that stores test data, such as test cases or scenarios that are applied to the product or a portion of the product to evaluate product performance and identify problems.

The device performs a scheduling function to determine how best to execute, and in what order to execute, each test data set. Various cost considerations may be taken into account as part of the scheduling, including the time required to execute the full test program and/or one or more test data sets, and the price of executing test data sets at a computing device, system or network. For example, the test program or portion thereof is to be executed using a computing resource such as a cloud service or other computing service provider. The price of executing the test program at various time periods (e.g., time of day, time of month or time of year) is determined. This price may be variable based on the time that services are requested and/or based on the number of users requesting services. For example, some services employ spot pricing that may change according to a set schedule or in response to events such as resource availability and congestion.

Based on the cost considerations, execution of the test program is schedules to, e.g., prioritize a portion of the test program to be executed with a higher priority, so that if there is a time or price constraint, the prioritized portion is executed first, and one or more other portions are delayed.

In one embodiment, scheduling includes identifying one or more test data sets that have a predictable result, i.e., are expected to generate a result that can be predicted with a selected level of certainty. For example, some test data sets or test buckets apply a scenario or test case and generate an output to indicate whether the result of executing the test data set is a "pass" or "fail" result. A pass result indicates that the product under test (or a portion thereof) has generated an output or otherwise behaved as desired in response to the test case. Similarly, a fail result indicates that generated output or behavior did not meet expectations. In some cases, a test data set can be expected to produce a pass or fail result with reasonable certainty. Test data sets for which the result can be predicted are referred to herein as predictable data sets.

As part of the scheduling, the device may identify data sets that are predictable, for example, by analyzing the results of previous test executions. As many testing processes entail repeated tests, there may be available a record of a plurality of past results that can be analyzed. For example, the pass results can be analyzed to determine a pass or fail rate, e.g., a percentage of test executions that result in a pass or fail result. Test data sets having a pass or fail rate above some threshold may be considered predictable. In another example, past results can be statistically analyzed to identify a trend or curve that can be used to estimate the likelihood of passing or failing.

The predictable data sets can be distinguished from test data sets that are not sufficiently predictable. These test data sets are referred to herein as "dynamic data sets". The device can schedule portions of the test program by, e.g., prioritizing the dynamic data sets. For example, the dynamic data sets can be executed at a time when the price per hour of a computing service is relatively high, and the predictable data sets can be deferred until a time when the price per hour is lower.

Figure 4:
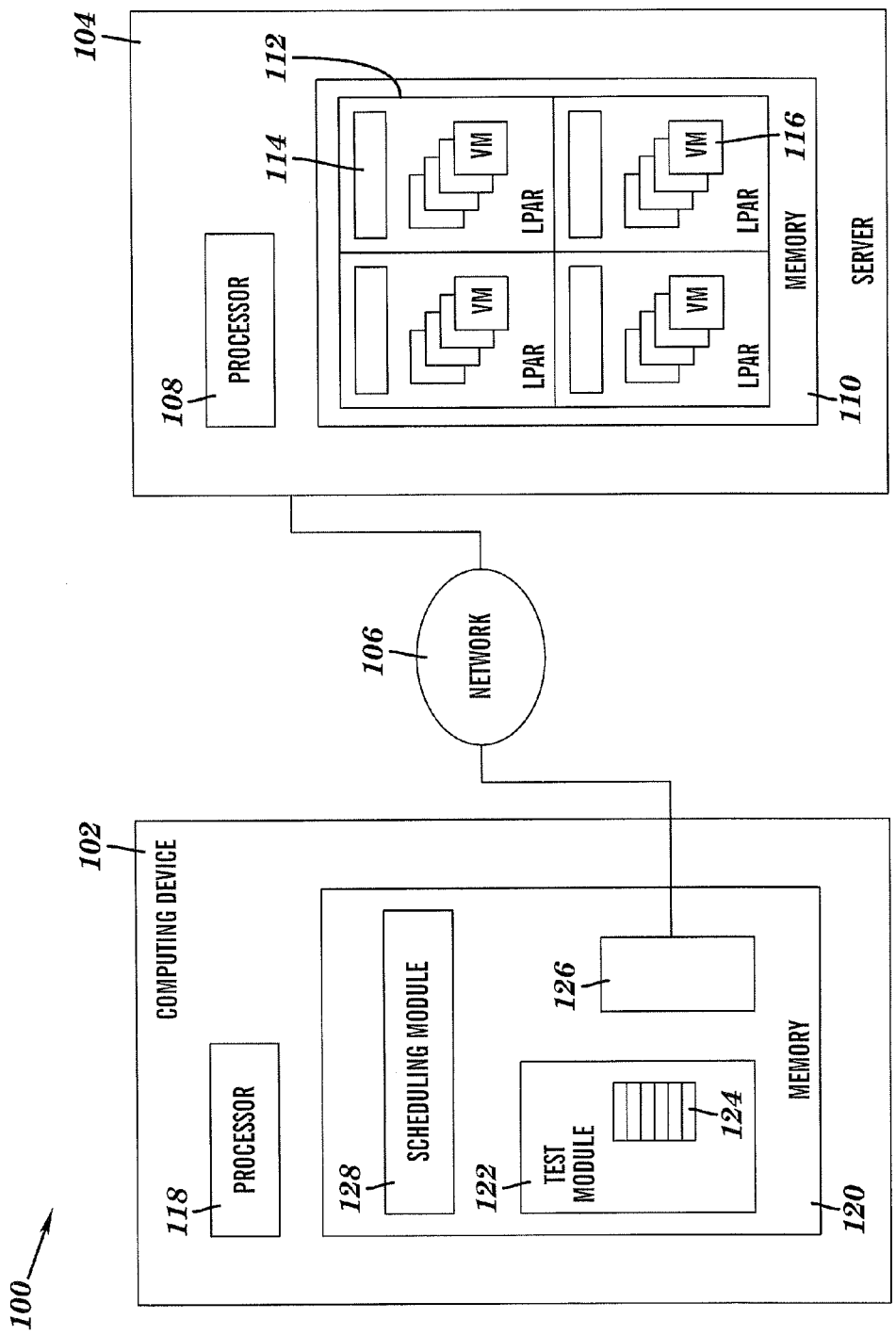
FIG. 4 depicts an embodiment of a computing environment that includes a processing device having processing modules configured to perform aspects of test data analysis and scheduling as described herein.

FIG. 4 illustrates an embodiment of a device or system configured to perform the testing and scheduling functions described herein. A processing environment 100 includes a processing device 102 (e.g., the processing device 12 shown in FIG. 1) that is able to communicate with a computing resource such as a remote processing device, e.g., a server 104. The computing device 102 may be connected to the server 104 via any suitable type of connection, such as a network 106 (e.g., the internet, a wide area network, a wireless network, etc.). The server 104 may be part of a cloud service or other type of computing service.

In one embodiment, the server 104 includes a processor 108 and a memory 110 that is partitioned into memory regions 112, also referred to in some instances as logical partitions (LPARs). Each region may store a hypervisor 114 and one or more virtual machines (VMs) 116.

The processing device 102 also includes a processor 118 and a memory 120 that stores various processing modules. For example, a test module 122 is configured to receive and store a test program and/or test data sets 124, and may also receive and store test results. An example of the test module 122 is a regression testing suite or a portion thereof. An interface module 126, such as a web browser or a program suite, provides connectivity to server 104 and/or other components of a computing service provider and allows users to access and request computing services.

The processing device 102 may also store a scheduling module 128 that performs functions such as analyzing test results, identifying dynamic and predictable test data sets, and coordinating execution of the test data sets 124. For example, the scheduling module 128 receives pricing information (e.g., spot pricing) from the server 104 or other source providing information regarding pricing. Based on factors such as a selected price cap, time requirements and other considerations, the scheduling module may determine whether and when to submit groups of test data sets to the server 104 for execution.

As discussed above, the scheduling module 128 can be executed by the computing device 102, but is not so limited. For example, the scheduling module 128, test module 122 and other processing modules may be executed at other locations, such as the server 104 or another processor connected to the computing device 102.

Figure 5:
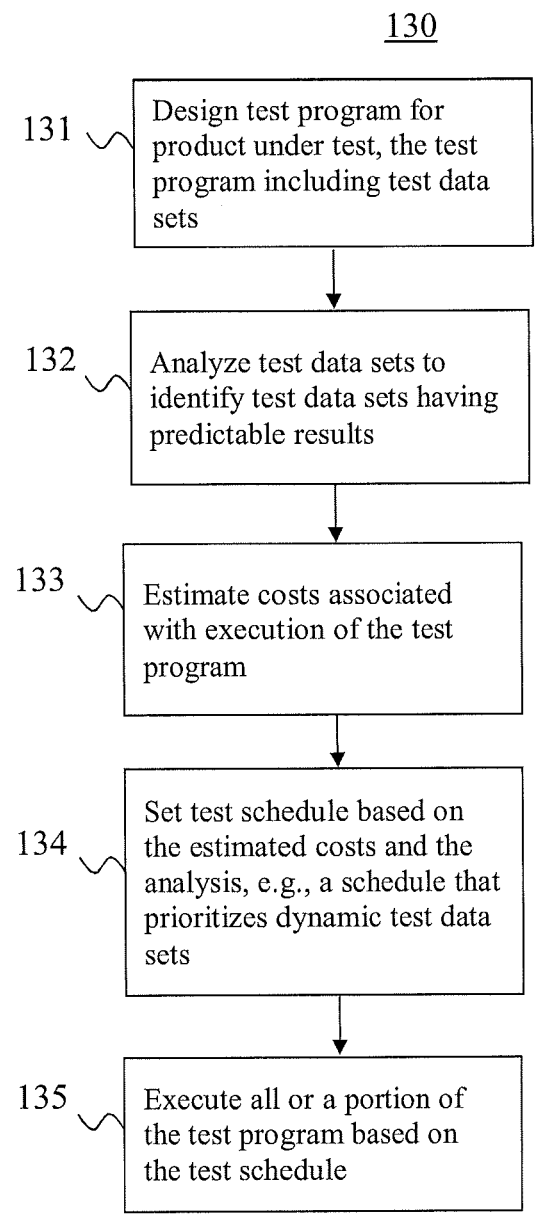
FIG. 5 is a flow diagram depicting an embodiment of a method of testing a computer product.

FIG. 5 is a process flowchart depicting an embodiment of a method 130 for performing aspects of testing a computer product. The method 130 includes a number of process steps or stages represented by blocks 131-135. The method 130 is described in conjunction with the processing device 12 and/or 102, but is not so limited. In one embodiment, the method 130 includes the execution of all of the stages shown in blocks 131-135 in the order described. However, certain stages may be omitted, stages may be added, or the order of the stages changed.

At block 131, a test process or algorithm (referred to as a test program) is designed to test various aspects of a computer product such as a software program under development. Any suitable type of test may be designed, such as a regression test, to evaluate the performance of the program. Performance may include internal processes performed by the program and output data generated by the program.

The test program is divided into a plurality of individual data sets representing test scenarios or test cases applied to parts of the program (e.g., code units). Each data set is referred to herein as a test bucket. A test program, such as a full regression suite, may include a large number (e.g., thousands) of individual test buckets.

At block 132, the test buckets are analyzed to estimate a schedule by which each test bucket is submitted to a computing resource, such as a cloud service, for testing. In one embodiment, the test buckets are analyzed to identify individual buckets or sets of buckets that produce results that can be predicted with some level of certainty, i.e., predictable results.

In one embodiment, a statistical analysis of one or more test buckets is performed to determine whether results associated with the test bucket can be predicted and/or to predict a result of the test bucket. The statistical analysis may be any type of analysis performed to predict a test result of a test bucket. The analysis may be performed based on previous executions of the test bucket, or based on information taken from tests performed using similar test buckets or similar test scenarios performed on a portion or unit of the program.

Examples of statistical criteria that may be used include a threshold value, a selected rate of change, a threshold statistical value (e.g., an average or running average), a selected statistical distribution, a result of a mathematical operation, or any other suitable criteria. Examples of statistical analysis include calculation of a summation, an average, a variance, a standard deviation, t-distribution, a confidence interval, and others.

In one embodiment, each test bucket is analyzed to determine pass or fail rates from previous executions. Test buckets having historically high pass rates as calculated from previous execution (e.g., 80-90% or more), or historically low pass rates, can be identified as having predictable results. For example, some test buckets are known to always pass, or at least pass at a rate exceeding a selected threshold, and are referred to as always-pass buckets. Likewise, some test buckets are known to always or persistently fail, or at least pass at a rate exceeding a threshold (or have a pass rate below a threshold).

For example, a first group of test buckets are known to have always passed or passed at a rate exceeding a threshold (e.g., 95%). This first group can this be predicted to pass with a reasonable certainty. A second group of test buckets are known to always fail or fail at a high rate (e.g., a 95% failure rate or 5% pass rate), and can thus be predicted to fail with reasonable certainty. A third group of test buckets, which do not have a pass rate exceeding a pass rate threshold or falling lower than a fail rate threshold, are considered dynamic test buckets that are not predictable with sufficient certainty.

In another example, test buckets can be analyzed statistically to estimate a curve or progression of test results, e.g., pass or fail rates. A test bucket may have an initial pass rate, which rises or falls relative to a number of test executions according to an identifiable curve or function. For example, after an initial pass or fail rate, or a spike in failures or passes, the pass or fail rate may increase according to a curve or trend line. A decay law or function may then be calculated based on passes or failures trending to some value. If this trend allow for prediction with sufficient certainty, a predicted pass or fail rate may be calculated.

The predictable test buckets are thereby distinguished from test buckets that are dynamic, i.e., do not have substantially predictable results. Such dynamic test buckets may be identified based on previous test results, e.g., test results that do not show a consistent or predictable result, or test results that have not been generated by previous executions.

It is noted that the particular pass and fail rates used as criteria, and the particular statistical criteria used, are not intended to be limiting. Any standard or criteria may be used to determine whether a test bucket can be considered to have a predictable result.

At block 133, a cost structure, relating to various costs associated with executing the test buckets, is estimated. "Costs" or "cost structure" refers to time and/or resources needed to execute the test buckets using a selected processing device, system or network. For example, costs may include the time required to execute individual buckets, portions of the test process or the entire test process. Costs may also refer to prices associated with utilizing a computing resource, such as the server 104. Other costs may include an amount of processing power or number of processors required to perform the test.

For example, the server 104 is part of a cloud service or other type of resource that offers processing services. The cloud service may have different pricing (e.g., spot pricing) depending on the time of day (or month or year) that computing services are requested. The pricing may also be dynamically adjusted based on the number of users or processes at a given time. For example, the price per minute, second or hour may be higher during the day or during other peak times, and lower at other times (e.g., overnight).

At block 134, a test schedule is determined or set based on identifying dynamic and predictable test buckets. The test buckets may be prioritized so that dynamic test buckets are given a higher priority or performed at a different time.

In one embodiment, a first set of test buckets including the dynamic test buckets are performed first, and a second set of buckets including predictable buckets are delayed to a different time. For example, a test program may have a maximum cost or price associated with it. At a given time, if the price per hour for use of the computing resource would exceed the maximum, or if execution of the full test program at the given time would be overly costly, the first set of test buckets is scheduled to be submitted and executed by the resource. The second set of buckets is deferred and scheduled for submission and execution at a later time when the price per hour is lower.

The test schedule, in addition to prescribing the timing of execution of tests, can also specify how the test buckets are to be apportioned to different resources. Based on the cost structure, the entire test may be performed sequentially, e.g., on a single computing resource, such as a deployed VM, or split into multiple parts and performed in parallel. For example, the test is divided into "N" parts, and each part is deployed to a different VM (or other computing resource) and executed simultaneously and/or during the same or overlapping time windows, so that each VM performs some fractional percentage of the tests (e.g., 1/N if distributed evenly).

Determining whether to execute sequentially or in parallel may be based on a selected price threshold. For example, if the price per hour of using the cloud service is below some threshold (a price per hour), the processing may be performed sequentially, or if the price exceeds the threshold, the test is scheduled to be executed in parallel.

At block 135, the test is performed, i.e., the test program is executed, according to the selected schedule. All or a portion of the test may be performed at a particular time or time period, portions of the test may be delayed, or the entire test may be timed to conform to selected costs.

At one or more of the above stages, the test program, test data sets, cost structure, schedule and/or test results may be displayed or otherwise output to a user. In one embodiment, costs and test data set groupings or classifications (e.g., predictable vs. dynamic) are displayed to a user via a display and/or interface (e.g., a graphical user interface) to allow the user to customize or adjust scheduling.

An example of a display and interface is shown in FIG. 6. This example is for illustration purposes and is not meant to be limited. The display and interface may have any configuration to allow a user to monitor the method and inspect various forms of information generated by the method, and input adjustments or preferences.

For example, after determining the cost structure (e.g., price per hour at a selected time), the device displays groups of test data sets according to whether they are predictable or dynamic. In the example of FIG. 6, the test data sets are test buckets, and the predictable data sets are displayed as common pass buckets (having a pass rate of greater than 96%) and common fail buckets (having a fail rate of greater than 99%). The dynamic test buckets are also displayed.

The user can select individual buckets or groups of buckets, for which the current cost (price per hour) is calculated. The user may change selections to compare different schedules, or allow the device to automatically calculate a schedule that minimizes costs or keeps costs below some selected level. For example, the user may select to run all or a selected number of dynamic test buckets now, and delay testing of predictable test buckets (e.g., always-pass and/or always-fail tests) to a later time. The later time can be selected manually or triggered by some pre-selected criteria (e.g., when the price per hour drops to a selected level). For example, the user may optionally remove the common pass and/or common fail tests to further optimize for cost structure, e.g., by selecting an option such as "run the least expensive configuration now" or "wait until spot pricing reaches this level will provide more coverage at a fraction (e.g., 45%) of the cost".

Technical effects and benefits include the ability to increase the cost efficiency of product testing, by allowing for deferment or scheduling of portions of a test program without significantly affecting the quality of product testing. For example, practitioners of software development in test might wish to defer execution of common pass and common fail tests in times when spot pricing increases for cloud execution of test cases. Embodiments described allow for such deferment to be accomplished automatically or manually, so that higher value tests are performed promptly, but costs are reduced by running relatively lower value tests later.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for testing of a computer product, the computer program product comprising:
a non-transitory tangible storage medium readable by a processing circuit and storing instructions for execution by the processing circuit for performing a method comprising:
receiving a test program configured to perform an evaluation of a computer product, the test program including a plurality of test data sets;
analyzing the plurality of test data sets to identify one or more predictable test data sets and one or more dynamic test data sets, the one or more predictable test data sets expected to produce a predictable test result, the predictable test result being a result of executing the test data set that can be predicted with a selected level of certainty, the one or more dynamic test data sets not expected to produce a predictable test result;
determining a cost structure associated with executing the test program using a computing resource; and
setting a test schedule based on identification of the one or more predictable test data sets and the one or more dynamic test data sets, and executing the test program at the computing resource based on the test schedule, wherein setting the test schedule includes setting a time at which a test data set is to be performed based on whether the test data set is a predictable test data set or a dynamic test data set.

2. The computer program product of claim 1, wherein the test data sets are test buckets configured as part of a regression test program.

3. The computer program product of claim 1, wherein each test data set is configured to output a pass result or a fail result, the pass result indicating that at least a portion of the computer product has performed according to expectations in response to a test case applied via the test data set.

4. The computer program product of claim 3, wherein analyzing includes estimating a pass rate for each test data set based on previous test results, each of the one or more predictable test data sets having a pass rate that is equal to or greater than a selected pass rate threshold.

5. The computer program product of claim 1, wherein the predictable test result is a result predicted for a test data set with a selected degree of certainty based on analysis of previous test results associated with the test data set.

6. The computer program product of claim 1, wherein the computing resource is a computing service, and the cost structure includes a variable price imposed for using the computing resource.

7. The computer program product of claim 6, wherein setting the test schedule includes scheduling execution of the dynamic test data sets for a first time period and scheduling execution of the predictable test data sets for a second time period, the second time period associated with a smaller value of the variable price than the first time period.

8. The computer program product of claim 6, wherein determining the cost structure includes determining a price value associated with a time period for execution of the test program using the computing resource, and setting the test schedule includes:
prescribing execution of all of the test data sets in sequence during the time period based on the price value being less than a selected price threshold; and
prescribing execution of at least two groups of test data sets in parallel during the time period based on the price value being equal to or greater than the selected price threshold.

9. A computer implemented method for testing of a computer product, the method comprising:
receiving, by a processing device, a test program configured to perform an evaluation of a computer product, the test program including a plurality of test data sets;
analyzing the plurality of test data sets to identify one or more predictable test data sets and one or more dynamic test data sets, the one or more predictable test data sets expected to produce a predictable test result, the predictable test result being a result of executing the test data set that can be predicted with a selected level of certainty, the one or more dynamic test data sets not expected to produce a predictable test result;
determining a cost structure associated with executing the test program using a computing resource; and
setting a test schedule based on identification of the one or more predictable test data sets and the one or more dynamic test data sets, and executing the test program at the computing resource based on the test schedule, wherein setting the test schedule includes setting a time at which a test data set is to be performed based on whether the test data set is a predictable test data set or a dynamic test data set.

10. The method of claim 9, wherein the test data sets are test buckets configured as part of a regression test program.

11. The method of claim 9, wherein each test data set is configured to output a pass result or a fail result, the pass result indicating that at least a portion of the computer product has performed according to expectations in response to a test case applied via the test data set.

12. The method of claim 11, wherein analyzing includes estimating a pass rate for each test data set based on previous test results, each of the one or more predictable test data sets having a pass rate that is equal to or greater than a selected pass rate threshold.

13. The method of claim 9, wherein the predictable test result is a result predicted for a test data set with a selected degree of certainty based on analysis of previous test results associated with the test data set.

14. The method of claim 9, wherein the computing resource is a computing service, and the cost structure includes a variable price imposed for using the computing resource.

15. The method of claim 14, wherein setting the test schedule includes scheduling execution of the dynamic test data sets for a first time period and scheduling execution of the predictable test data sets for a second time period, the second time period associated with a smaller value of the variable price than the first time period.

16. The method of claim 14, wherein determining the cost structure includes determining a price value associated with a time period for execution of the test program using the computing resource, and setting the test schedule includes:
prescribing execution of all of the test data sets in sequence during the time period based on the price value being less than a selected price threshold; and
prescribing execution of at least two groups of test data sets in parallel during the time period based on the price value being equal to or greater than the selected price threshold.

17. A system for testing of a computer product, the system comprising:
a processing device configured to transmit data to a computing resource and receive data from the computing resource, the computing resource configured to receive requests for execution of a test program, the processing device configured to perform a method comprising:

receiving the test program configured to perform an evaluation of a computer product, the test program including a plurality of test data sets;

analyzing the plurality of test data sets to identify one or more predictable test data sets and one or more dynamic test data sets, the one or more predictable test data sets expected to produce a predictable test result, the predictable test result being a result of executing the test data set that can be predicted with a selected level of certainty, the one or more dynamic test data sets not expected to produce a predictable test result;

determining a cost structure associated with executing the test program using a computing resource; and setting a test schedule based on identification of the one or more predictable test data sets and the one or more dynamic test data sets, and executing the test program at the computing resource based on the test schedule, wherein setting the test schedule includes setting a time at which a test data set is to be performed based on whether the test data set is a predictable test data set or a dynamic test data set.

18. The system of claim 17, wherein each test data set is configured to output a pass result or a fail result, the pass result indicating that at least a portion of the computer product has performed according to expectations in response to a test case applied via the test data set.

19. The system of claim 18, wherein analyzing includes estimating a pass rate for each test data set based on previous test results, each of the one or more predictable test data sets having a pass rate that is equal to or greater than a selected pass rate threshold.

20. The system of claim 17, wherein the computing resource is a computing service, and the cost structure includes a variable price imposed for using the computing resource, wherein setting the test schedule includes scheduling execution of the dynamic test data sets for a first time period and scheduling execution of the predictable test data sets for a second time period, the second time period associated with a smaller value of the variable price than the first time period.

* * * * *